United States Patent [19]

Hilton

[11] Patent Number: 4,626,646

[45] Date of Patent: Dec. 2, 1986

[54] SHIELDING GAS FOR ELECTRIC ARC WELDING

[75] Inventor: Derrick E. Hilton, Manchester, England

[73] Assignee: BOC Limited, London, England

[21] Appl. No.: 556,501

[22] Filed: Nov. 30, 1983

[30] Foreign Application Priority Data

Sep. 12, 1983 [GB] United Kingdom ............... 8235074

[51] Int. Cl.[4] .................. B23K 9/00; B23K 35/38
[52] U.S. Cl. .................................... 219/74; 219/75
[58] Field of Search ................ 219/74, 75; 252/372

[56] References Cited

U.S. PATENT DOCUMENTS

| 3,139,506 | 6/1984 | Wolff et al. | 219/74 |
| 3,496,323 | 2/1970 | Lesnewich et al. | 219/74 |
| 4,463,243 | 7/1984 | Church | 219/74 |

FOREIGN PATENT DOCUMENTS

| 796949 | 6/1958 | United Kingdom. |
| 1121594 | 7/1968 | United Kingdom. |
| 1157347 | 7/1969 | United Kingdom. |
| 1294451 | 10/1972 | United Kingdom. |
| 1358985 | 7/1974 | United Kingdom. |
| 1510120 | 8/1975 | United Kingdom. |
| 1515165 | 6/1978 | United Kingdom. |
| 1539917 | 2/1979 | United Kingdom. |
| 1543733 | 4/1979 | United Kingdom. |
| 2059999 | 4/1981 | United Kingdom. |
| 2124531 | 2/1984 | United Kingdom. |

Primary Examiner—E. A. Goldberg
Assistant Examiner—Catherine M. Sigda
Attorney, Agent, or Firm—David A. Draegert; Larry R. Cassett

[57] ABSTRACT

A shielding gas for use in electric arc welding is disclosed. The gas comprises a mixture of helium, argon, 1.75% to 2.25% carbon dioxide and 0.25% to 1.0% oxygen (by volume). Use of the gas enables slag-free welds which accept readily paint applied by an electrostatic deposition process.

16 Claims, 2 Drawing Figures

SHIELDING GAS FOR ELECTRIC ARC WELDING

This invention relates to gas shielded electric arc welding and is directed to the composition of the shielding gas used to surround the arc and to protect the arc weld pool. The invention is particularly, though not exclusively, concerned with a shielding gas composition for use in an embodiment of the gas shielded arc welding process known as gas metal arc welding (MIG).

In the MIG process an electric arc is struck and maintained between the workpiece to be welded and a consumable welding electrode which is continuously fed into the arc and which is of the required weld filler metal composition. The MIG process conventionally is used with all of the major commercial metals including carbon, alloy and stainless steels, aluminium, nickel, copper, and alloys of these metals. It is, however, not restricted to these metals or alloys.

Thus, while a variety of specific welding techniques and filler metals may be used in the MIG process, the process is characterised by a shielding gas which is directed on to the arc to shroud the weld pool and which is effective to prevent the pool and the subsequent weld from being oxidised or corroded by air or other ambients. The shielding gas in MIG typically is applied to the weld pool by way of a nozzle through which the consumable welding electrode in the form of a wire or rod is continuously fed.

It has been proposed particularly when MIG welding carbon or manganese steel to use a shielding gas comprising either pure carbon dioxide or mixtures of argon with either carbon dioxide or oxygen.

Typical argon/carbon dioxide mixtures previously used have contained carbon dioxide within the range 3.0% to 25% by volume while argon/oxygen mixtures have contained oxygen up to 3% by volume.

One important requirement for metal products welded by MIG is to accept readily paint applied by electrostatic deposition; that is to say, deposition in the form of a spray in which the paint particles and the exposed metal surface are electrically charged to opposite polarities. The charge induced attraction between the paint and the metal produces a relatively greater paint impact and improves paint metal bonding and consequent adhesion.

It has been found that conventional shielding gas compositions of the type recited, particularly when used in relation to manganese containing steels produce islands of slag on the solidified weld pool; these islands are relatively electrically insulating and accordingly produce local areas over which electrostatically induced paint bonding is considerably inhibited.

Attempts have been made to reduce slag island formation, particularly in MIG welding by varying the manganese and/or silicon content of the consumable welding electrode. While some reduction can be achieved in this way the incidence of slag is still too high to produce an acceptable weld surface suitable inter alia for a good and homogeneous paint finish; it is accordingly one object of the present invention to provide an improved arc welding process displaying a cleaner weld surface.

According to its broadest aspect the present invention provides a shielding gas for use in electric arc welding and comprising a mixture of helium, argon, carbon dioxide and oxygen.

Preferably the gas mixture includes carbon dioxide within the range of 1.75% to 2.25% by volume and oxygen within the range of 0.25% to 1.0% by volume with the remainder being helium and argon except for incidental impurities. It envisaged that for the production of good weld surfaces, the impurity levels, particularly of water vapour and hydrocarbons, should be kept to the order of parts per million.

While the ratio of helium to argon in the gas mixture of the invention is not critical, the concentration of helium conveniently lies within the range of 95% to 65% by volume.

The use of a gas mixture according to the invention has been found to inhibit substantially the formation of slag islands on the weld surface and avoids the need for surface cleaning before the application of paint.

BRIEF DESCRIPTION OF THE DRAWINGS

While in one suitable embodiment, the gas mixture contains about 1.9% by volume of carbon dioxide, 0.3% of oxygen, 20% of argon with the remainder being substantially helium, it has been found that any oxygen to carbon dioxide ratio falling within the shaded area of FIG. 1 provides particularly good inhibition of surface slag. Thus, while FIG. 1 illustrates preferred oxygen/carbon dioxide concentration ratios it also demonstrates surprisingly that for substantially slag-free welding conditions oxygen, as well as carbon dioxide, must be present in the shielding gas.

Carbon dioxide is known to dissociate in an electric arc to produce free oxygen which is believed to produce not only good arc transfer of metal from the electrode to the weld pool but also, and more importantly, to support a surface slag forming mechanism. A slag-free weld can, for example, be produced with a shielding gas substantially free of either carbon dioxide or oxygen but with considerably impaired weld quality.

The use of a shielding gas mixture according to the present invention thus produces the surprising result of a weld of good characteristic which is substantially free of slag formation, notwithstanding the presence not only of carbon dioxide but also of added free oxygen.

Figure 1:
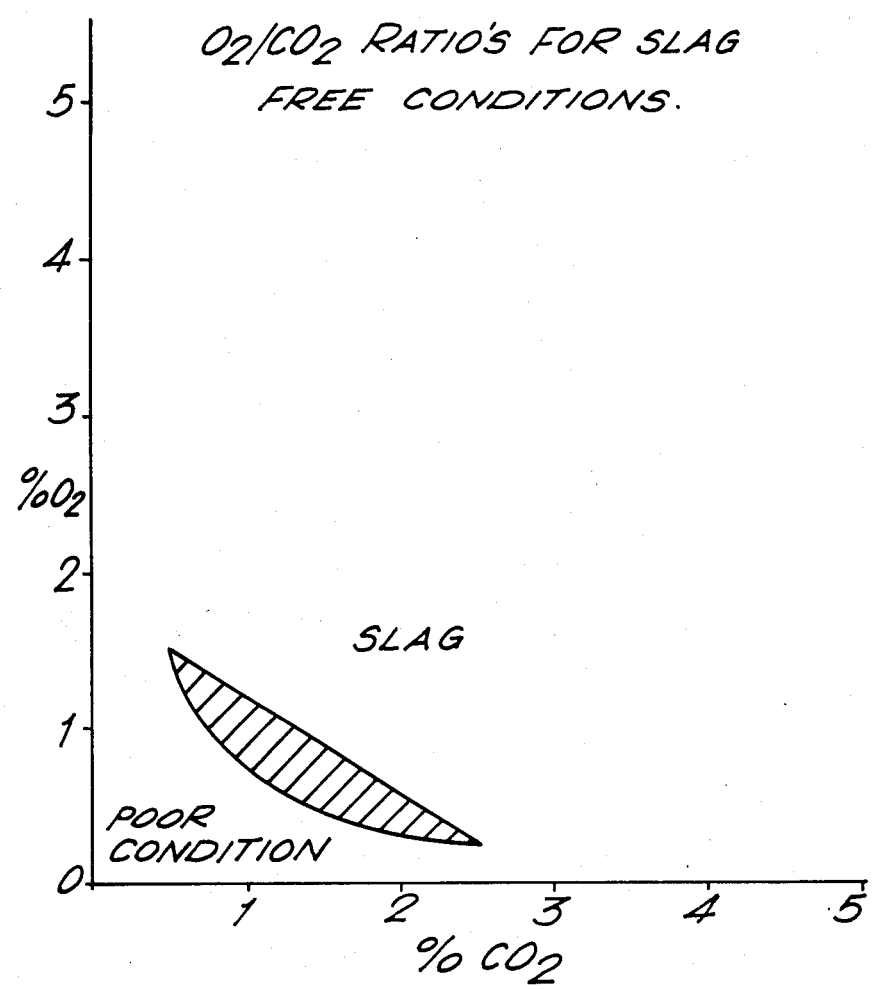
FIG. 1 is a graph illustrating oxygen and carbon dioxide concentrations which are preferred for inhibiting surface slag.
Figure 2:
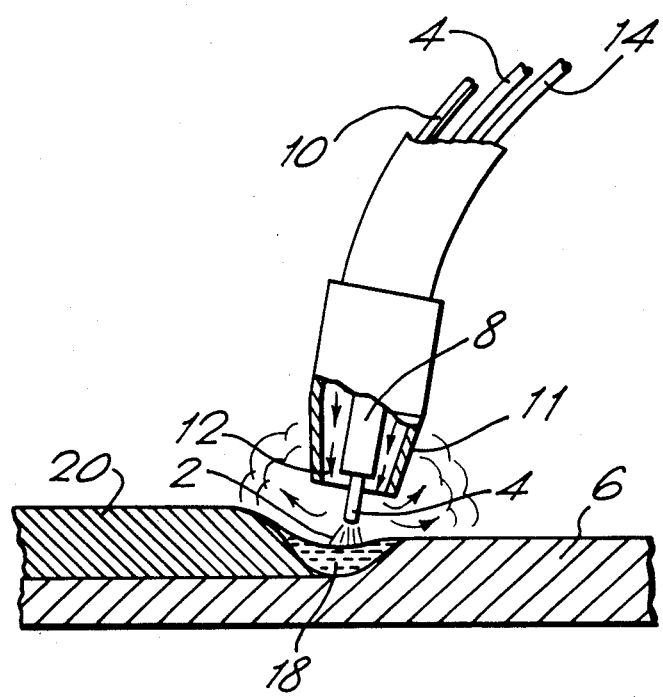
FIG. 2 is a schematic representation of a typical MIG arc welding arrangement.

The shielding gas of the invention may be applied to the welding arc in any of the ways well known in the art exemplified in FIG. 2 which illustrates a typical MIG arc welding arrangement.

In FIG. 2, an electric arc 2 is struck and maintained between a consumable electrode 4 and the workpiece 6. The electrode is fed into the arc through a guide tube 8 which is effective to make electrical contact between the electrode and the current conductor 10 forming the electrical connection to one terminal of the power supply, (not shown).

Surrounding the wire guide 8 is a gas nozzle 11 which forms an annular gap 12 through which a shielding gas according to the invention is applied from a conventional storage cylinder by way of a supply tube 14.

In use, the welding wire is transferred through the arc to the workpiece to form a weld pool 18 which solidifies to a metal weld 20. By use of the shielding gas of the invention the surface of the metal weld is substantially free of slag inclusions and forms an improved surface, not only for painting but for application of other coatings which are required to be uniformly homogeneous.

In one example of the invention applied to the arc welding of components of a car subframe or back axle by the apparatus of FIG. 2, a welding wire of 0.8 millimeters diameter is used as a weld filler material. The wire has a composition of 0.08% carbon, 1.2% manganese, 0.7% silicon, 0.02% sulphur and 0.02% phospherous, with the remainder being iron except for incidental impurities. The wire is fed to the weld at the rate of 666 inches per minute to transfer filler metal to the weld pool.

A shielding gas having a composition of 80% helium, 17.5% argon, 2.0% carbon dioxide and 0.5% oxygen, is applied to the area surrounding the weld pool to provide effective shielding and eliminating the formation of slag islands in the solidified weld.

It will be appreciated that the scope of the invention of this case includes cylinders or other suitable containers filled with the shielding gas disclosed as well as the gas itself.

I claim:

1. A shielding gas mixture for welding, comprising by volume carbon dioxide within the range 1.75% to 2.25% together with oxygen within the range 0.25% to 1.0% with the remainder being helium and argon except for incidental impurities.

2. A gas mixture as claimed in claim 1, in which the concentration of helium lies within the range of 95% to 65% by volume.

3. A gas mixture as claimed in any preceeding claim, containing by volume 1.9% carbon dioxide, 0.3% oxygen and 20% argon with the remainder being helium except for incidental impurities.

4. A gas mixture as claimed in claim 1 or 2 containing by volume 2.0% carbon dioxide, 0.5% oxygen, 17.5% argon and 80% helium with the remainder being incidental impurities.

5. A cylinder or suitable container filled with a gas mixture comprising by volume carbon dioxide within the range 1.75% to 2.25% together with oxygen within the range 0.25% to 1.0% with the remainder being helium and argon except for incidental impurities.

6. A cylinder or container as claimed in claim 5 in which the concentration of helium lies within the range 65% to 95% by volume.

7. A gas mixture as claimed in claim 5 or 6 containing by volume 1.9% carbon dioxide, 0.3% oxygen and 20% argon with the remainder being helium except for incidental impurities.

8. A cylinder or container as claimed in claim 5 or 6 containing by volume 2.0% carbon dioxide, 0.5% oxygen, 17.5% argon and 80% helium with the remainder being incidental impurities.

9. A method of electric arc welding including the step of applying to the arc a shielding gas mixture comprising by volume carbon dioxide within the range 1.75% to 2.25% together with oxygen within the range 0.25% to 1.0% with the remainder being helium and argon except for incidental impurities.

10. A method of electric arc welding as claimed in claim 9 in which the concentration of helium lies within the range 65% to 95% by volume.

11. A method of electric arc welding as claimed in claim 9 or 10 in which the gas mixture contains by volume 1.9% carbon dioxide, 0.3% oxygen and 20% argon with the remainder being helium except for incidental impurities.

12. A method of electric arc welding as claimed in claims 9 or 10 in which the gas mixture contains by volume 2.0% carbon dioxide, 0.5% oxygen, 17.5% argon and 80% helium with the remainder being incidental impurities.

13. A method according to claim 12 further comprising the step of applying paint to a welded area by electrostatic deposition.

14. A method according to claim 9 further comprising the step of applying paint to a welded area by electrostatic deposition.

15. A method according to claim 10 further comprising the step of applying paint to a welded area by electrostatic deposition.

16. A method according to claim 11 further comprising the step of applying paint to a welded area by electrostatic deposition.

* * * * *